United States Patent [19]

Aikawa

[11] Patent Number: 4,639,006
[45] Date of Patent: Jan. 27, 1987

[54] SUSPENSION ARM ASSEMBLY FOR SUPPORTING AUTOMOBILE WHEEL

[75] Inventor: Hiroshi Aikawa, Tokyo, Japan

[73] Assignee: Nissan Motor Co., Ltd., Japan

[21] Appl. No.: 789,929

[22] Filed: Oct. 22, 1985

Related U.S. Application Data

[63] Continuation of Ser. No. 331,071, Dec. 16, 1981, abandoned.

[30] Foreign Application Priority Data

Jan. 19, 1981 [JP] Japan ................. 56-5519[U]

[51] Int. Cl.$^4$ .............................................. B60G 7/00
[52] U.S. Cl. ................................... 280/96.1; 280/660
[58] Field of Search ................... 280/96.1, 660, 95 R

[56] References Cited

U.S. PATENT DOCUMENTS

| | | | |
|---|---|---|---|
| 2,960,348 | 11/1960 | Sarowski et al. | 280/96.1 |
| 3,139,275 | 6/1964 | Burkitt | 267/20 |
| 3,144,259 | 8/1964 | De Hann | 280/96.1 |
| 3,161,419 | 12/1964 | Schaaf | 280/96.1 |
| 3,938,822 | 2/1976 | Guerriero | 280/95 R |
| 4,225,148 | 9/1980 | Andersson | 280/95 R |
| 4,327,927 | 5/1982 | Tanaka et al. | 280/96.1 |
| 4,336,953 | 6/1982 | Low | 280/95 R |

FOREIGN PATENT DOCUMENTS

| | | |
|---|---|---|
| 1101179 | 3/1961 | Fed. Rep. of Germany . |
| 1430266 | 11/1968 | Fed. Rep. of Germany . |
| 2408259 | 9/1975 | Fed. Rep. of Germany . |
| 2627847 | 12/1977 | Fed. Rep. of Germany . |
| 2645749 | 4/1978 | Fed. Rep. of Germany . |
| 2715463 | 6/1978 | Fed. Rep. of Germany . |
| 1191583 | 4/1959 | France . |
| 1591438 | 4/1970 | France . |
| 640469 | 7/1950 | United Kingdom . |
| 886543 | 1/1962 | United Kingdom . |
| 1357835 | 6/1964 | United Kingdom . |
| 1003255 | 9/1965 | United Kingdom . |
| 1559217 | 1/1980 | United Kingdom . |
| 2065574 | 7/1981 | United Kingdom . |

Primary Examiner—Richard A. Bertsch
Attorney, Agent, or Firm—Lane and Aitken

[57] ABSTRACT

A suspension arm for supporting an automobile wheel is joined with a gusset by two bushing means. The gusset is fixed to an automobile body to hold the suspension arm to the automobile body. Each of the bushing means is placed coaxially with the other in the fore and aft direction of the automobile and allows the suspension arm to turn up and down. Preferably, each of the bushing means comprises a bushing and a pin inserted into the bushing.

12 Claims, 5 Drawing Figures

SUSPENSION ARM ASSEMBLY FOR SUPPORTING AUTOMOBILE WHEEL

This is a continuation of U.S. Patent application Ser. No. 331,071, filed Dec. 16, 1981, now abandoned.

BACKGROUND OF THE INVENTION

The present invention relates generally to a suspension arm assembly for supporting an automobile wheel, and more specifically to such a suspension arm assembly having an improved construction for mounting a suspension arm on an automobile body.

A suspension arm or a control arm holds an automobile wheel to a mounting portion of an automobile body, and transmits sidewise force from the wheel to the body. Accordingly, the mounting portion of the automobile body must be constructed to be sufficiently rigid. However, such a requirement brings about several disadvantages, such as an increase of the total weight of an automobile and deterioration of production efficiency.

SUMMARY OF THE INVENTION

It is an object of the present invention to provide a suspension arm assembly which is arranged to improve a mounting construction for mounting a suspension arm on an automobile body.

According to the present invention, a suspension arm assembly for supporting a front wheel of a front engine front wheel drive automobile mainly comprises a suspension arm for supporting the front wheel, and a gusset to be fastened to an automobile body. The suspension arm assembly of the present invention further comprises first and second bushing means disposed between the suspension arm and the gusset for swingably joining the suspension arm with the gusset. Each of the bushing means is placed coaxially with the other along the fore and aft direction of the automobile.

DETAILED DESCRIPTION OF THE INVENTION

Figure 1A:
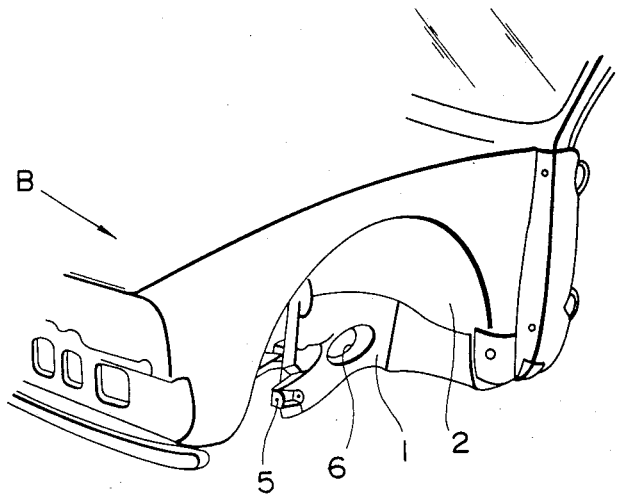
FIG. 1A is a perspective view showing a conventional type mounting portion of an automobile body.
Figure 1B:
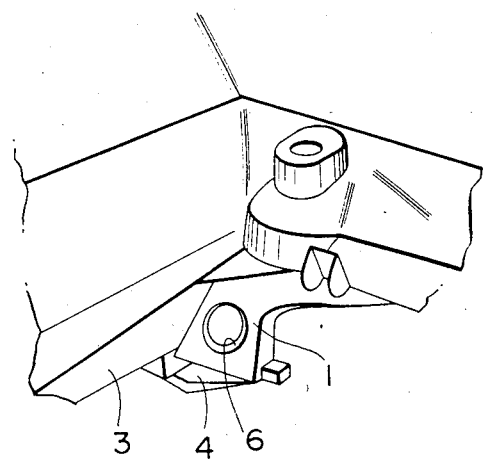
FIG. 1B is a perspective view of a portion of FIG. 1A viewed from the direction of the arrow B of FIG. 1A.

Referring first to FIGS. 1A and 1B, a brief reference will be made to one example of the conventional structure for mounting a suspension arm on the automobile body. A side member 1 is made of a heavy plate and fastened to the automobile body 2 by arc welding. A brace 4 is welded between the side member 1 and a dash crossmember for reinforcement against sidewise force. There are further provided a mounting portion 5 for mounting a suspension arm and a hole 6 for a steering linkage.

In such a conventional construction, however, the side member 1 is placed high so as not to offer obstruction to a drive shaft, and the suspension arm mounting portion 5 is disposed under the side member 1. Accordingly, in order to provide enough rigidity against sidewise force exerted on the mounting portion 5 from the wheel, it is necessary to make the side member 1 of a heavy plate and to reinforce the structure with the brace 4 by arc welding. Thus, such a conventional mounting construction has disadvantages in the production efficiency and the fuel economy of an automobile because of increases in the number of assembly processes and the total weight of the automobile. Especially, use of arc welding in automobile assembly processes is obstructive to automatization of manufacturing. Furthermore, because the suspension arm is generally mounted on the mounting portion in a full rebound state in view of working efficiency, a bushing interposed between the suspension arm and the mounting portion is always subjected to one sided torsion during car running, and this deteriorates the durability of the bushing.

Figure 2:
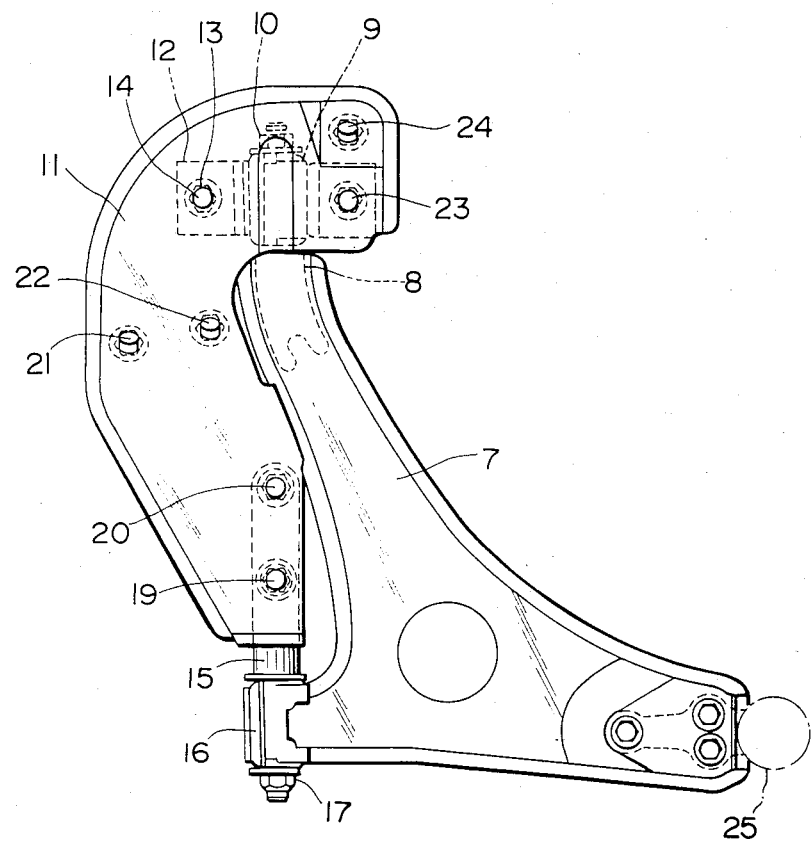
FIG. 2 is a plan view showing one embodiment of the present invention.
Figure 3:
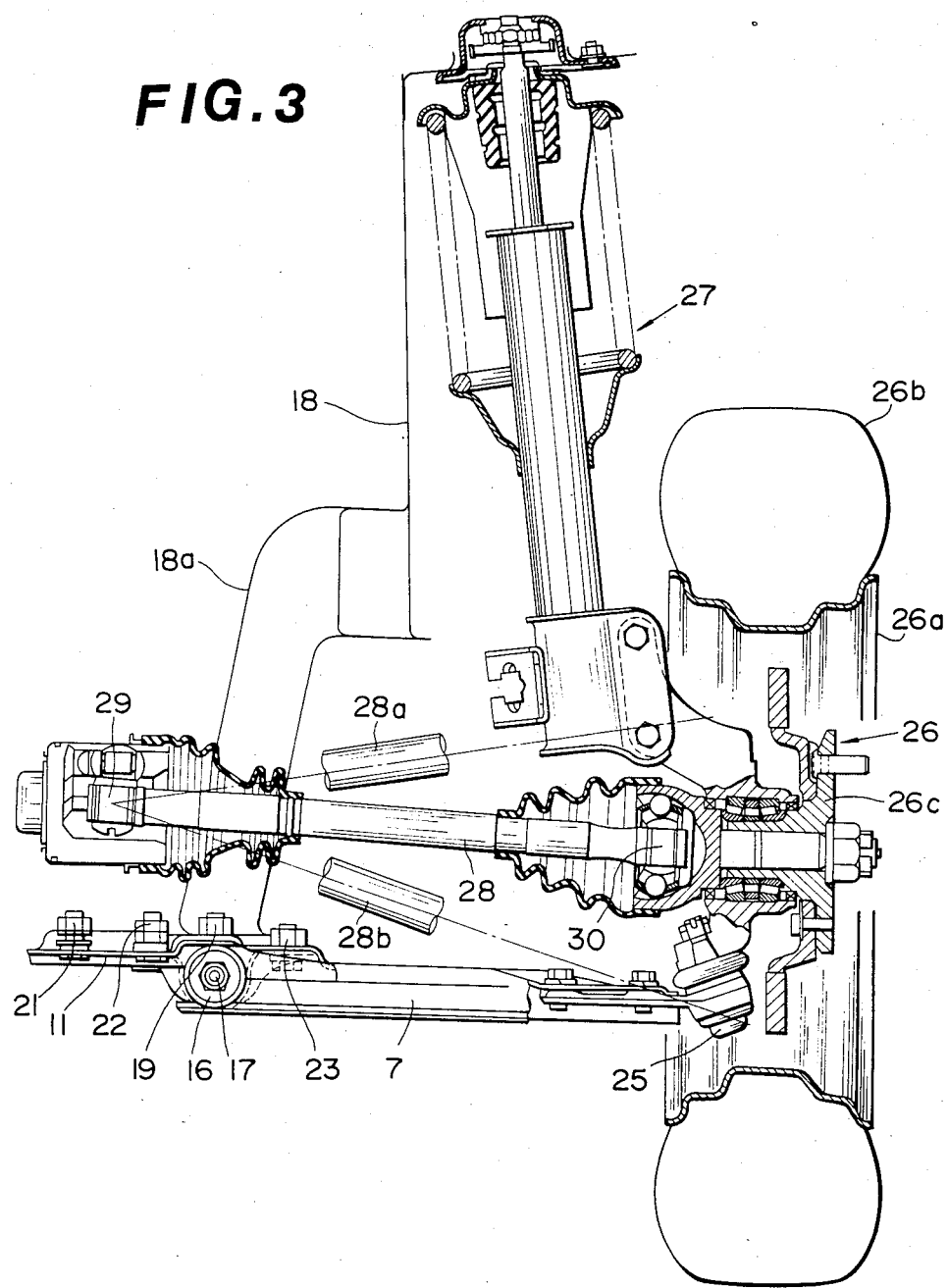
FIG. 3 is a front view showing the suspension arm and the gusset of FIG. 2 mounted on a vehicle body.
Figure 4:
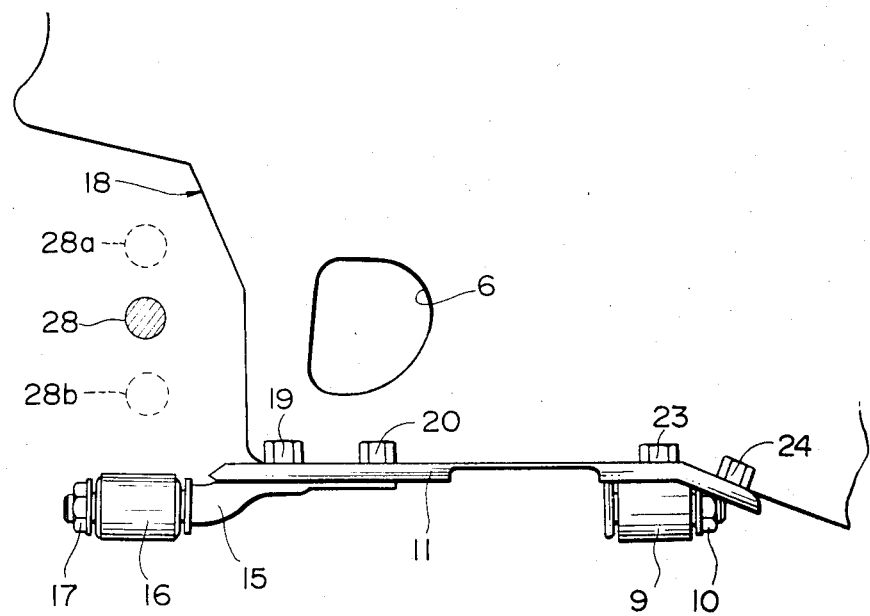
FIG. 4 is a side view showing the vehicle body, the gusset and the bushing shown in FIG. 3.

In view of the above description, reference is now made to FIGS. 2, 3 and 4, wherein an embodiment of the present invention is shown.

In this embodiment, the present invention is applied to a strut type front suspension. A suspension arm or a control arm 7 has a first pin 8 which is welded thereto and has an axis extending in the fore and aft direction of the automobile. A first bushing 9 is attached to the pin 8 and fastened by a nut 10. There is provided a gusset 11, to which the bushing 9 is fixed with a mounting bracket 12 by tightening a bolt 14 to a nut 13 welded to the gusset 11.

The gusset 11 has a second pin 15 which is welded thereto and has an axis extending in the fore and aft direction. The pin 15 is inserted through a second bushing 16 which is forcibly inserted into a position of the suspension arm 7 and fastened by a nut 17. Thus, the pins 8 and 15, and the bushings 9 and 16 are all oriented coaxially along the fore and aft direction, and by these pins and bushings, the suspension arm 7 and the gusset 11 are connected together. The gusset 11 is fixed to a dash crossmember 18a of a vehicle body 18 with bolts and nuts 19, 20, 21, 22, 23 and 24.

The suspension arm 7 supports a vehicle wheel 26 through a ball joint 25. The vehicle wheel 26 is further supported by a strut assembly 27 disposed between the vehicle body 18 and the vehicle wheel 26. A drive shaft 28 connects a final gear with the wheel 26 through constant velocity universal joints 29 and 30. Reference numerals 28a and 28b denote the positions of the drive shaft 28, respectively in a full jounce state and a full rebound state. Reference numeral 6 denotes a hole through which a steering linkage is inserted.

The operations of this embodiment are as follows: First, the suspension arm 7 is joined with the gusset 11 in the following manner. Preliminarily, the pins 8 and 15 are welded, respectively, to the suspension arm 7 and the gusset 11. The bushing 16 is forcibly inserted in a position of the suspension arm 7, and the bushing 9 is attached to the pin 8 and fastened by the nut 10. After such a preparatory arrangement, the suspension arm 7 is joined with the gusset 11 by inserting the pin 15 of the gusset 11 into the bushing 16 and at the same time inserting the bushing 9 attached to the pin 8 of the suspension arm 7 between the gusset 11 and the mounting bracket 12. Then, the angle between the suspension arm 7 and the gusset 11 is set at the most suitable angle for the bushings 9 and 16 to work. Usually, the most suitable angle is a neutral angle between the full jounce state and the full rebound state. After the best angle is selected, the bushing 16 is fastened to the pin 15 by tightening the nut 17, and the bushing 9 is fastened to the gusset 11 by tightening the bolt 14 and the nut 13 and fastening the mounting bracket 12 to the gusset 11. In some circumstances, it is convenient to tighten the nuts 13 and 17 temporarily at this stage and fully tighten them later.

Secondly, the suspension arm 7 joined with the gusset 11, the strut assembly 27, and the drive shaft 28 are connected to the vehicle wheel 26, which has, at this stage, neither a road wheel 26a nor a tire 26b. Then, the gusset 11 and the top end of the strut assembly 27 are fixed, respectively, to the vehicle body 18, while the end of the drive shaft 28 is connected to the final gear. Fixing of the gusset 11 is done by the bolts and nuts 19, 20, 21, 22, 23 and 24. After that, the road wheel 26a with the tire 26b is mounted on a front hub 26c.

Thus, the vehicle wheel 26 is supported on the vehicle body by the suspension arm 7 and the gusset 11 on the one hand, and by the strut assembly 27 on the other hand. The suspension arm 7 and the gusset 11 give a support to the wheel in the fore and aft direction and the right and left direction, and the strut assembly 27 gives a support in the up and down direction. Torsional movement of the bushings 9 and 16 allow the suspension arm 7 to swing up and down as the vehicle wheel 26 moves up and down. Sidewise force exerted on the vehicle wheel 26 is received by the gusset 11 through the bushings 9 and 16 and the pins 8 and 15.

Thus, according to the present invention, the bushings 9, 16 interposed between the gusset 11 and the suspension arm 7 can be fastened while the suspension arm is held at the most advantageous angle for the durability of the bushings. Furthermore, the gusset 11 receives sidewise force from the vehicle wheel and transmits it to the vehicle body, so that sidewise force is not applied directly to the vehicle body but dispersed by the gusset. Accordingly, the suspension arm assembly of the present invention does not requires so high rigidity of the suspension arm mounting portion of the vehicle body, and eliminates the necessity of the brace which must be joined by undesirable arc welding and causes obstruction to other parts of the automobile, so that the production efficiency is improved and the mounting construction is simplified.

What is claimed is:

1. A front engine front wheel drive motor vehicle comprising:
    a vehicle body;
    right and left front road wheels; and
    right and left suspension arm assemblies each of which includes a suspension arm supporting one of said front road wheels;
    first and second bushing means placed apart from and coaxially with each other along the longitudinal direction of the vehicle,
    a substantially flat and horizontal gusset plate swingably joined with said suspension arm by said first and second bushing means, and fixed substantially horizontally to a downwardly facing surface of said vehicle body by at least three nonpermanent fastening means in such a manner that said gusset plate can be removed from said vehicle body and fixed again, said fastening means being distributed along both the longitudinal direction and the lateral direction of the vehicle on a substantially horizontal planar surface of said gusset plate and at least two of said fastening means being spaced along the longitudinal direction of the vehicle at a distance approximately equal to a space between said first and second bushing means, said first bushing means projecting from said gusset plate towards the front of the vehicle, said second bushing means being located ahead of a rear end of said gusset plate under said gusset plate.

2. A motor vehicle according to claim 1 wherein said gusset plate of each assembly serves as a brace for said surface of the vehicle body.

3. A motor vehicle according to claim 2, wherein said fastening means comprise bolts extending substantially vertically.

4. A suspension arm assembly according to claim 3, wherein said first bushing means comprises a first bushing held by said suspension arm and a first pin permanently fixed to said gusset plate and inserted into said first bushing, and said second bushing means comprises a second bushing held by said gusset and a second pin permanently fixed to said suspension arm and inserted into said second bushing.

5. A suspension arm assembly according to claim 4, wherein said first pin and said second pin of each assembly extend in the opposite directions.

6. A motor vehicle according to claim 5, wherein, in each assembly, said first bushing means is placed ahead of said second bushing means along the fore and aft direction of the vehicle, and said first pin projecting from said gusset plate toward the front of the vehicle.

7. A motor vehicle according to claim 6 wherein said gusset plate of each assembly is fixed to a dash cross member of the vehicle body.

8. A motor vehicle according to claim 6, wherein in each assembly, said second bushing is disposed between an underside of said gusset plate and a bracket which is fixed to the underside of said gusset plate plate by at least two of said bolts distributed on both sides of said second bushing.

9. A front engine front wheel drive motor vehicle comprising:
    right and left road wheels connected with right and left drive shafts, respectively,
    a vehicle body comprising a cross portion extending laterally between right and left sides of said vehicle body, and right and left mounting portions extending longitudinally toward the front of said vehicle, respectively, from right and left end of said cross portion, and terminating at respective front ends located rearwardly of said drive shafts; and
    right and left suspension arm assemblies each of which comprises
    a suspension arm supporting one of said front road wheels,
    first and second bushing means placed apart from and coaxially with each other along the longitudinal direction of the vehicle,
    said first bushing means being located ahead of said front end of said mounting portion,
    a substantially flat and horizontal gusset plate joined swingably with said suspension arm by said first and second bushing means, and fixed substantially horizontally to downwardly facing surfaces of said cross portion and one of said right and left mounting portions by at least three nonpermanent fastening means in such a manner that said gusset plate can be removed from said vehicle body and fixed again, said fastening means being distributed along both of the longitudinal direction and the lateral direction of said vehicle in a substantially horizontal planar surface of said gusset plate, said first bushing means projecting from said gusset plate toward the front of the vehicle, and said second bushing means being located ahead of a rear end of said gusset plate under said gusset plate.

10. A motor vehicle according to claim 9, wherein each of said mounting portion extends vertically, and has a hole through which a steering linkage is inserted.

11. A motor vehicle according to claim 9 wherein, in each assembly, at least one of said fastening means is located ahead of a middle point between said first and second bushing means, at least one of said fastening means is located near said second bushing means on an outboard side of said second bushing means at a position whose distance from said first bushing means along the longitudinal direction of the vehicle is equal to or longer than a distance of said second bushing means from said first bushing means along the longitudinal direction of the vehicle, and at least one of said fastening means is located on an inboard side of said second bushing means.

12. A motor vehicle according to claim 9, wherein, in each assembly, said gusset plate has a front portion to which said first pin is fixed and a rear portion holding said second bushing, and said suspension arm has a front portion holding said first bushing and a rear portion to which said second pin is fixed, said front portion of said gusset plate being interposed between said front and rear portion of said arm and said rear portion of said arm being interposed between said front and rear portions of said gusset plate.

* * * * *